(12) United States Patent
Sylvain

(10) Patent No.: US 8,792,625 B2
(45) Date of Patent: Jul. 29, 2014

(54) CALL SERVER SELECTION

(75) Inventor: Dany Sylvain, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 1784 days.

(21) Appl. No.: 11/615,294

(22) Filed: Dec. 22, 2006

(65) Prior Publication Data

US 2008/0151869 A1  Jun. 26, 2008

(51) Int. Cl.
*H04M 1/64* (2006.01)

(52) U.S. Cl.
USPC .......... 379/88.17; 379/221.02; 370/351; 370/352; 370/356

(58) Field of Classification Search
USPC ............ 379/88.17, 93.32, 221.01–221.07; 370/351–353, 356
See application file for complete search history.

(56) References Cited

U.S. PATENT DOCUMENTS

| | | | |
|---|---|---|---|
| 6,028,921 A * | 2/2000 | Malik et al. | 379/201.04 |
| 6,310,941 B1 | 10/2001 | Crutcher et al. | |
| 6,611,589 B1 * | 8/2003 | Yang | 379/221.15 |
| 6,882,640 B1 * | 4/2005 | Berger et al. | 370/353 |
| 7,400,881 B2 * | 7/2008 | Kallio | 455/412.2 |
| 7,764,778 B2 * | 7/2010 | Allen et al. | 379/221.02 |
| 2001/0050911 A1 * | 12/2001 | Eastman | 370/352 |
| 2002/0126819 A1 * | 9/2002 | Case et al. | 379/218.01 |
| 2002/0176404 A1 * | 11/2002 | Girard | 370/352 |
| 2005/0021761 A1 | 1/2005 | Thomas | |
| 2009/0316687 A1 * | 12/2009 | Kruppa | 370/352 |

FOREIGN PATENT DOCUMENTS

EP  1 093 282 A2  4/2001

OTHER PUBLICATIONS

European Search Report for EP Appl. No. 07024920.6, mailed Nov. 10, 2009.

* cited by examiner

*Primary Examiner* — Oleg Asanbayev
(74) *Attorney, Agent, or Firm* — Withrow & Terranova, PLLC

(57) ABSTRACT

In a click-to-call communication environment, the present invention is employed to select an appropriate call server to use when establishing a call between two endpoints. A computing terminal provides a request to initiate a call between the two endpoints. The request is passed to a service node directly or through any number of intermediate nodes, such as a web server. The request may identify a source and a destination for the call. The service node will select a call server to use for establishing the call between the two endpoints based on the destination for the call, and send instructions to the call server to initiate the call. In response, the call server will initiate the call between the two endpoints.

27 Claims, 11 Drawing Sheets

GENERAL DESTINATION: XYZ.COM OR 800-XYZ-CORP

| SOURCE INFO. | CONTEXT INFO. | SPECIFIC DESTINATION ADDRESS |
|---|---|---|
| +1 * | ENGLISH | +1(416) 583-7382 |
| +1 * | FRENCH | +1(514) 373-2891 |
| +33 * | * | +33 05 12 23 42 23 |
| + 2...32 * | * | +44 09 12 22 42 84 |
| +23 * | RESERVATION | +23 39 39 40 38 10 |
| ⋮ | ⋮ | ⋮ |
| SIP: * | * | SIP:CALLCENTER@XYZ.COM |

\* WILDCARD

FIG. 7

| CALL SERVER SELECTION TABLE | |
|---|---|
| DESTINATION INFO. | CALL SERVER |
| +1(416) * | CSA, CSC |
| +1(514) * | CSB |
| +33 * | CSB |
| +44 * | CSC |
| ... | ... |
| SIP: * | CSZ |

* WILDCARD

FIG. 8

CALL SERVER SELECTION

FIELD OF THE INVENTION

The present invention relates to telecommunications, and in particular to selecting a call server for telephony calls initiated in response to a click-to-call selection in electronic media or an electronic application.

BACKGROUND OF THE INVENTION

As the Internet and associated web services evolve, there is a movement to associate telephony calls with certain web applications. In click-to-call scenarios, an icon to initiate a telephony call may be provided in a web page, which is supported by a web client, such as a web browser. Upon selecting the icon, the web client may initiate the telephony call to a destination associated with the icon, wherein a voice session is automatically established. The ability to initiate telephony calls by simply clicking on an icon in a web page provides significant value to users and content providers.

The telephony call is originated by the web client, which is provided by a computing terminal. In many instances, the computing terminal is not equipped to support telephony calls, since many computing terminals are personal computers or personal digital assistants without the hardware and software necessary to support telephony calls. Even if the computing terminal is capable of supporting telephony calls via the web client, the user may wish to use another telephony terminal, such as a mobile, home, or work telephone for a telephony call to the destination associated with the icon. If another telephony terminal is desired, the user is not able to take advantage of the icon to automatically initiate the call and must take separate measures to initiate the telephony call.

Select computing terminals may support a web client as well as provide a telecommunication client for supporting telephony calls over virtually any type of network. Although the telecommunication client can support telephony calls, the web client is not able to engage the telecommunication client to initiate calls in response to selecting the icon in a click-to-call event. In essence, the telecommunication client is isolated from the web client. As such, any telephony calls initiated from the web client must be supported by the web client, not the telecommunication client.

In co-assigned U.S. patent application Ser. No. 11/316,431 filed Dec. 22, 2005, the disclosure of which is incorporated herein by reference, a computing terminal with a unique telecom control function is presented. The telecom control function is configured to receive call indicia when a call tag in a software entity, such as an application or electronic document, is selected by a user of the computing terminal. The call indicia provides information associated with a remote party with which a call is being requested by the user. The telecom control function may use the call indicia along with user indicia obtained from the user and indirectly establish a call with the remote party using a telephony terminal other than the computing terminal. If the computing terminal includes a telecommunication client capable of supporting a call, the telecom control function may instruct the telecommunication client to directly initiate the call with the remote party using the call indicia. Based on user indicia or predetermined criteria, the telecom control function may select between an indirect or direct initiation of the call in a dynamic fashion, and then effect initiation of the call, either directly or indirectly. Indirect call initiation generally entails the telecom control function directly or indirectly instructing a call control entity to take the requisite steps to initiate a call between the remote party and another telephony terminal associated with the user.

Initiation of the call generally involves instructing a call server to establish the call between the two telephony terminals. In essence, the call server will route call legs to both telephony terminals and then have the legs connected when the telephony terminals are answered. The telephony connection is established between the telephony terminals as if the call were directly initiated from one telephony terminal to another.

Depending on the location of the respective telephony terminals, the service providers supporting the telephony terminals, and the types of communication services supported by the telephony terminals, only certain call servers may be available for the call. If multiple call servers are available for the call, certain call servers may be more appropriate for the call based on routing efficiency, available services, costs, and the like. Accordingly, there is a need for an efficient and effective technique to automatically select a call server for click-to-call calls.

SUMMARY OF THE INVENTION

In a click-to-call (C2C) communication environment, the present invention is employed to select an appropriate call server to use when establishing a call between two endpoints. A computing terminal provides a request to initiate a call between the two endpoints. The request is passed to a service node directly or through any number of intermediate nodes, such as a web server. The request may identify a source and a destination for the call. The service node will select a call server to use for establishing the call between the two endpoints based on the destination of the call, and send instructions to the call server to initiate the call. In response, the call server will initiate the call between the two endpoints.

The service node may identify multiple call servers that are capable of establishing the call from a group of call servers. When selecting a given call server, the service node may take steps to facilitate load balancing among the call servers as well as check the status of the call servers to ensure that the call can be handled by a particular call server. Other criteria may be used when selecting a given call server to use for the call. The destination of the call may be a general destination, which is associated with multiple specific destinations.

The service node may use the source for the call to select one of the multiple specific destinations that are associated with the general destination. The specific destination is then used to select an appropriate call server to use for the call instead of the general destination. Further, context information pertaining to a defined context associated with the call may be provided to the service node by the computing terminal. The service node may also use the context information alone or in conjunction with the source information to select a specific destination for the call.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 7 is a table illustrating exemplary associations between a general destination and specific destinations.

FIG. 8 illustrates an exemplary call server selection table according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
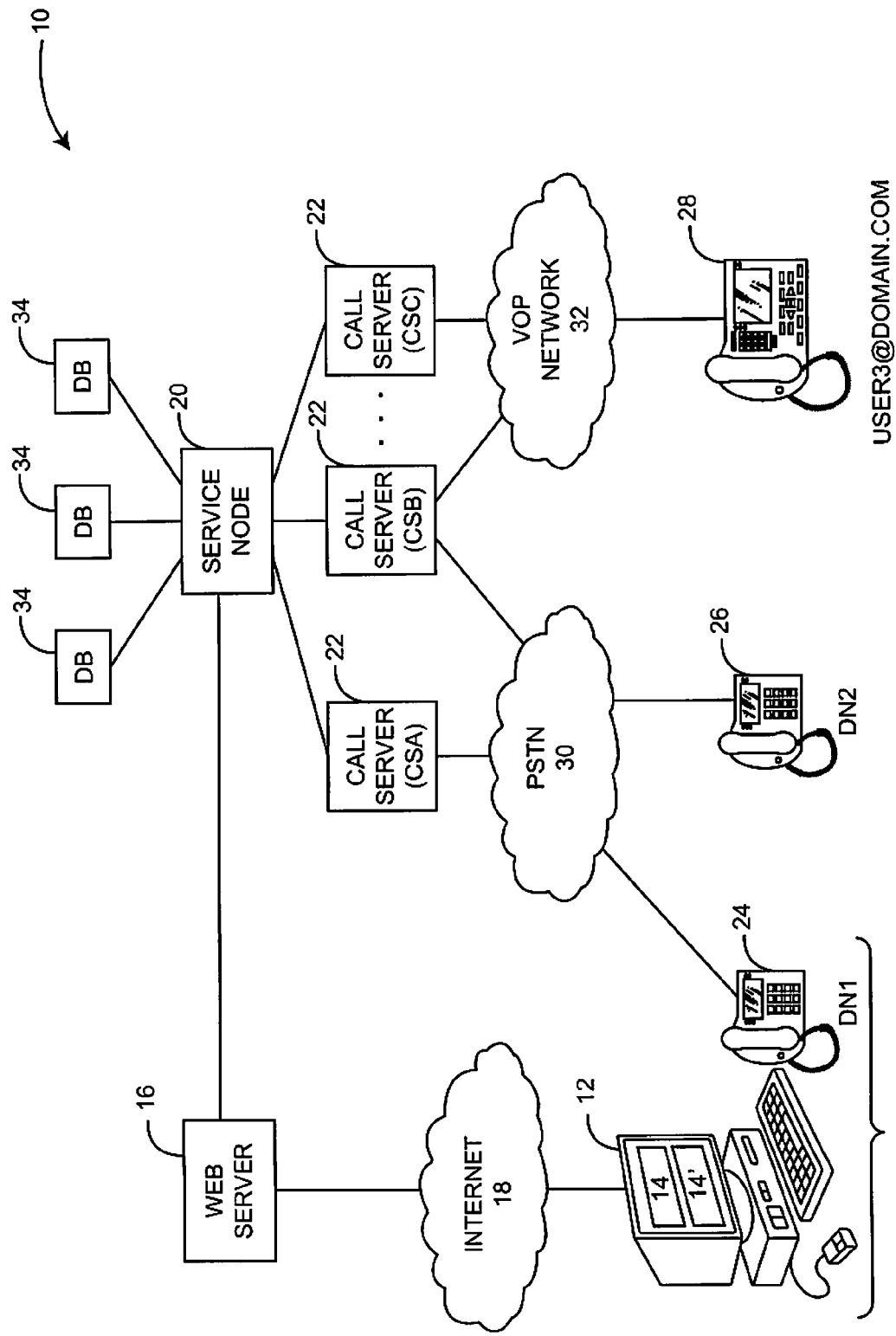
FIG. 1 is a block representation of a communication environment according to one embodiment of the present invention.

FIG. 1 depicts a communication environment 10 that supports click-to-call functionality according to one embodiment of the present invention. A user (User 1) is associated with a computing terminal 12, which provides a web browser 14 and optionally a telecom control function 14'. The web browser 14 provides standard browsing functionality. The telecom control function 14' cooperates with the web browser 14 and other software entities to obtain click-to-call related information. Via the web browser 14, the computing terminal 12 communicates with a web server 16 over the Internet 18 or like communication network.

To initiate a click-to-call call, the web browser 14 of the computing terminal 12 sends a request to the web server 16 to initiate a call between two or more endpoints, where one of the endpoints, like the computing terminal 12, is associated with the user. The request will generally identify a source and a destination corresponding to the respective endpoints for the call. The request is then sent to a service node 20, which will select an appropriate call server 22 (CSA, CSB, and CSC) to use for establishing the call between the two endpoints based on the destination for the call and any other desired criteria. Once the call server 22 is selected, instructions are sent to the call server 22 to initiate the call. In response, the call server 22 will initiate the call between the two endpoints. Alternatively, the computing terminal 12 may send the request directly to the service node 20 to avoid passing the request through the web server 16.

As illustrated, the available endpoints include a first terminal 24, a second terminal 26, and a third terminal 28. The first terminal 24 is associated with User 1 and may be considered a source for the call, even though the call is not originated from the first terminal 24 in a traditional fashion. The second and third terminals 26, 28 are remote endpoints associated with a destination with which user 1 wants to communicate. The first terminal 24 is associated with directory number DN1, the second terminal 26 is associated with directory number DN2, and the third terminal 28 is associated with a uniform resource locator (URL) user3@domain.com.

As an exemplary embodiment, only the first and second terminals 24, 26 are depicted as being supported by the public switched telephone network (PSTN) 30, which may represent any type of wired or wireless network supporting circuit-switched communications. The third terminal 28 is depicted as being supported by a voice-over-packet (VoP) network 32, which could include the Internet or like packet-based network that supports packet-based communications. The PSTN 30 and the VoP network 32 are considered to include any necessary access networks as well as have the appropriate inter-working infrastructure to support communications therebetween.

In many instances, only certain call servers 22 are capable of establishing a call between two endpoints. As illustrated, the PSTN 30 is supported by call servers CSA and CSB where the VoP network 32 is supported by call servers CSB and CSC. The call servers 22 may also be limited to geographic regions, service types, or the like. The service node 20 may be assigned to or otherwise associated with certain call servers 22 and select a call server 22 to use for a particular call based on the destination for the call.

The service node 20 may identify multiple call servers 22 that are capable of establishing the call from a group of call servers 22. When selecting a given call server 22, the service node 20 may take steps to facilitate load balancing among the available call servers 22 as well as check the status of the available call servers 22 to ensure that the call can be handled by a given call server 22. Other criteria may be used when selecting a given call server to use for the call. In addition to or in lieu of user or call indicia, any number of databases (DB) 34 may be accessed to obtain information helpful in selecting an appropriate call server 22. The databases 34 may take various forms and provide various types of information or services related to address translation, call server selection, destination address selection, and the like. Details related to call server selection are provided further below.

The destination provided in the request from the computing terminal 12 may be a specific destination associated with a desired endpoint or a general destination, which is associated with multiple specific destinations. A specific destination may be associated with a given company, home, user, or endpoint. A general destination may be associated with a main or central location, from which a call could be routed to another location, specific user, or endpoint. An example of a general destination may be a main corporate number, which is associated with various specific locations associated with customer support, sales, human resources, and employees. These specific destinations may also be broken into geographical or contextual categories, such that different specific destinations correspond to different countries or supported languages.

Click-to-call calls are often initiated from web pages with embedded click-to-call URLs where the call indicia are used to direct the call to a general destination, which is associated with numerous specific destinations. Once the call is established with the general destination, an operator or automated attendant will direct the call to an appropriate specific destination. Prior to the present invention, there was generally no control over the call server 22 that is used to establish the call to the general destination or an ability to readily select a specific destination and bypass the general destination.

The service node 20 may use the information related to the source for the call to select one of multiple specific destinations that are associated with a general destination. The specific destination is then used to select an appropriate call server 22 to use for the call instead of the general destination. Further, context information pertaining to a defined context associated with the call may be provided to the service node 20 by the computing terminal 12. The service node 20 may use the context information alone or in conjunction with the source information to select a specific destination for the call. Such information may be obtained or derived from the computing terminal 12 or databases 34.

Click-to-call calls may alternatively be triggered by a user selecting a call tag in a software entity provided by the computing terminal 12. When the call tag is selected, the call indicia associated with the call tag is provided to the telecom control function 14', which may control initiation of the telephony call for the communication terminal 12. The call tag may be an icon, string, link, or any other element that is selectable by the user and associated with call indicia for establishing a call with a given destination. The call indicia may be a directory number or telephony address associated with the destination. The telecom control function 14' may obtain user indicia from the user to assist in determining how or where the call should be initiated. Based on the call indicia and any available user indicia, the telecom control function 14' will then take the necessary steps to send an appropriate request to initiate the call to the web server 16, which will send a corresponding request to the service node 20.

The software entity may be any type of electronic document, such as a web page, instant message, email, word processing document, or spreadsheet. The telecom control function 14' may be co-resident with an application supporting the electronic document, or part of an application having a call tag. The application supporting the electronic document or a supporting operating system may be configured to recognize a request in response to selecting a call tag, and direct the request to the telecom control function 14' for processing. Alternatively, an application may be configured to automatically direct a request or at least the call indicia to the telecom control function 14' in response to a user selecting a call tag.

Figure 2:
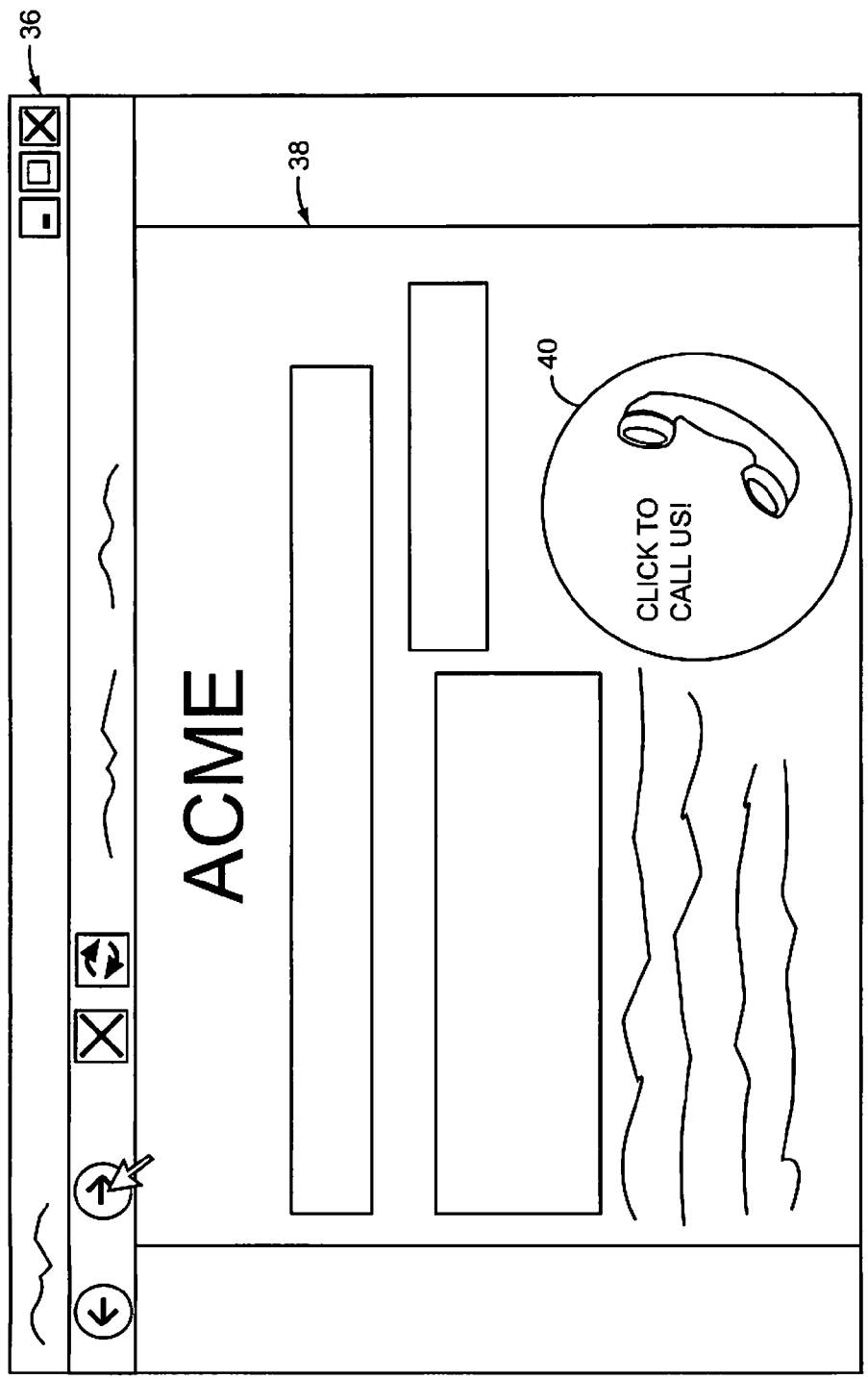
FIG. 2 illustrates a web page including a click-to-call tag displayed on a web browser.
Figure 3:
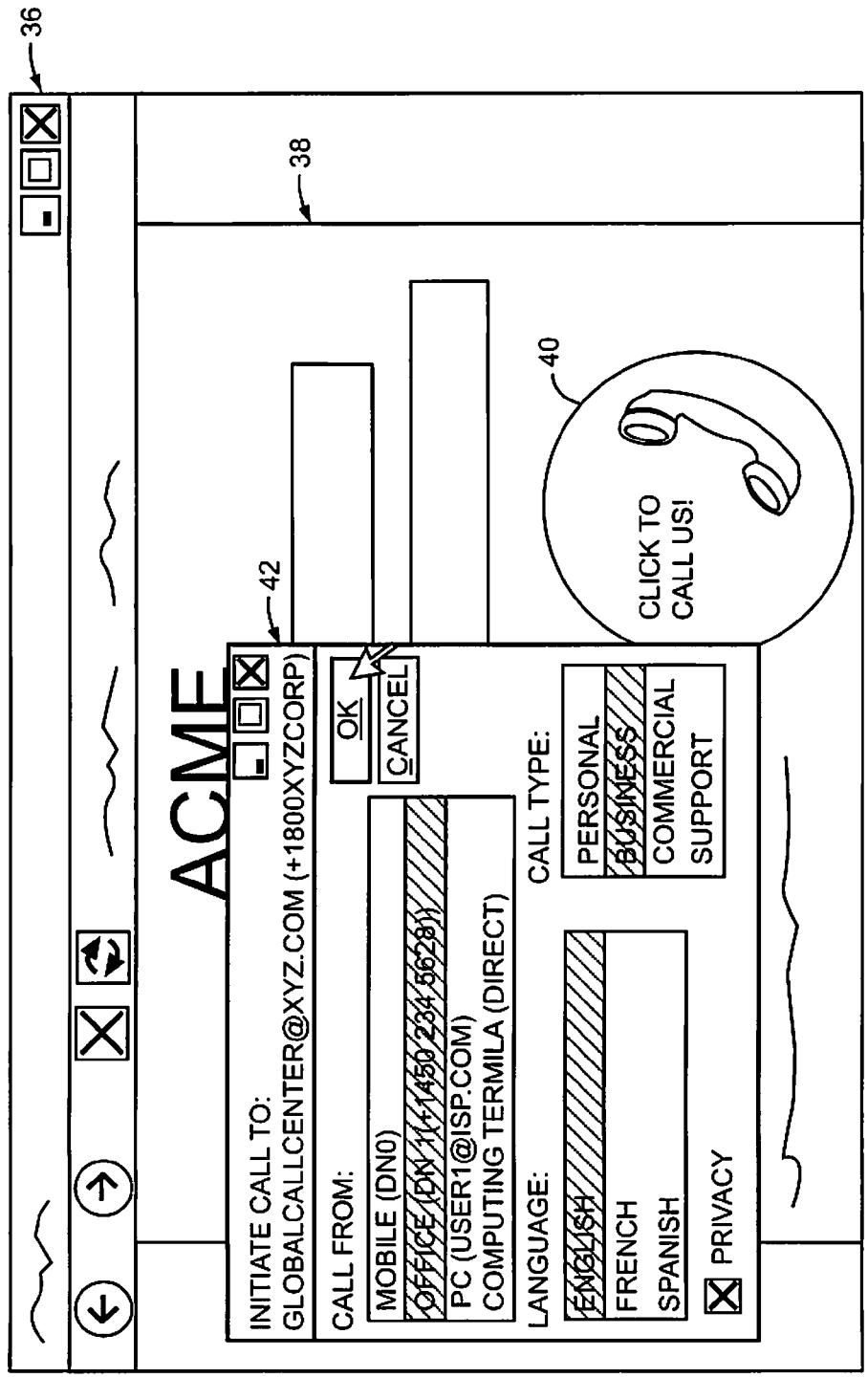
FIG. 3 illustrates a pop-up window provided upon selecting the click-to-call tag provided in the web page illustrated in FIG. 2.

With reference to FIG. 2, a scenario is illustrated from a user perspective where a call tag is selected. In this example, a web browser interface 36 provided by the browser 14 is capable of receiving and displaying a web page 38 on the communication terminal 12. Embedded in the web page 38 is a click-to-call tag 40. The click-to-call tag 40 is provided in the web page 38 to allow the user to simply click or otherwise select the click-to-call tag 40 and establish a call with a remote endpoint, such as the second or third terminals 26, 28, using associated call indicia. Since many communication terminals cannot support the call or the user may desire to use the first telephony terminal 24 for the call, selecting the click-to-call tag 40 may trigger an interaction with the web server 16 and a new browser pop-up window 42 as shown in FIG. 3 to query the user for user indicia to assist in establishing the call with the remote endpoint.

The pop-up window 42 may identify the remote endpoint by name or by telephony address in a general or specific fashion. In this example, the remote endpoint represents a general network address (globalcallcenter@xyz.com) or directory number (1 800 XYZ CORP) for a global call center. The type of communication address may correspond to a directory number, a Session Initiation Protocol (SIP) address, a peer-to-peer address, or a uniform resource locator (URL). The second and third terminals 26, 28 may be associated with the global call center and may represent specific endpoints associated with the general, remote endpoint.

The pop-up window 42 may also allow the user to select a direct or indirect method for establishing the call, and if indirect, another endpoint to use for the call. As illustrated, the user is provided with a choice to initiate the call from an associated mobile terminal associated with directory number DN0; the first terminal (office) 24 associated with directory number DN1; a PC associated with address user1@isp.com; or the computing terminal 12. Assume that the first terminal 24 is selected to use for the call, as indicated by the highlighting. Selecting the mobile, office, or PC terminals would result in an indirect establishment of a call from the selected endpoint to the remote endpoint, whereas selection of the computing terminal 12 would result in a direct initiation of a call from the computing terminal 12 using an integrated telecom client (not illustrated).

The pop-up window 42 is configured to allow the user to readily provide any user indicia to assist with initiating the call. The user indicia may take various forms including source information and context information. The source information corresponds to the particular endpoint of the user to use when establishing the call, while the context information provides information bearing on a context associated with the call. The context information may vary significantly from one application to another. As illustrated, the context information may identify a preferred language to associate with the call, whether the call is private, and the type of call being established. The type of call may identify the call as a personal, business, commercial, support call, or the like. When the user selects "OK," any appropriate source, destination, and context information is sent to the web server 16 in association with a request to initiate a call.

Figure 4:
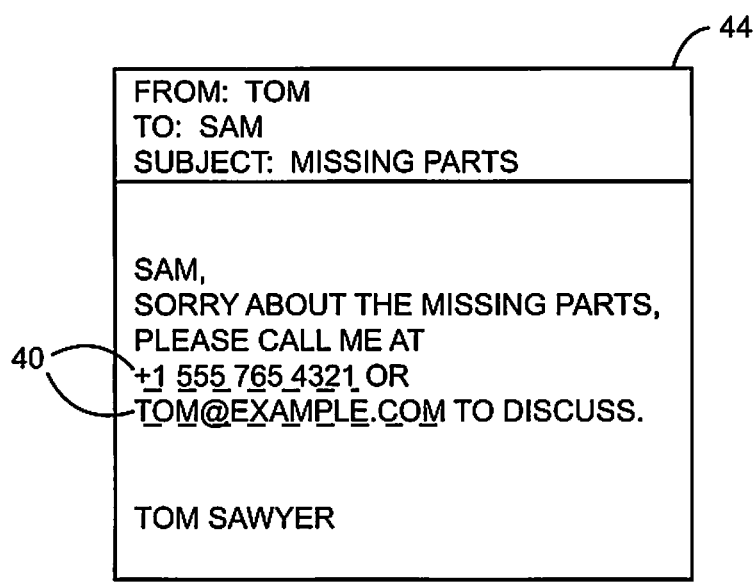
FIG. 4 illustrates an email or instant message including click-to-call tags.

An example of providing click-to-call tags 40 in an email or instant message 44 is illustrated in FIG. 4, wherein selecting "Tom@example.com" or "+1 555 765 4321" results in an alert with associated call indicia being provided to the telecom control function 14' to initiate a call to Tom Sawyer by either the computing terminal 12 or an endpoint, such as the first terminal 24. Although an email or instant message 44 is illustrated, the click-to-call tags 40 may be provided in any type of software entity, such as a web page, email, instant message, or word processing, spreadsheet, or presentation document.

Figure 5:
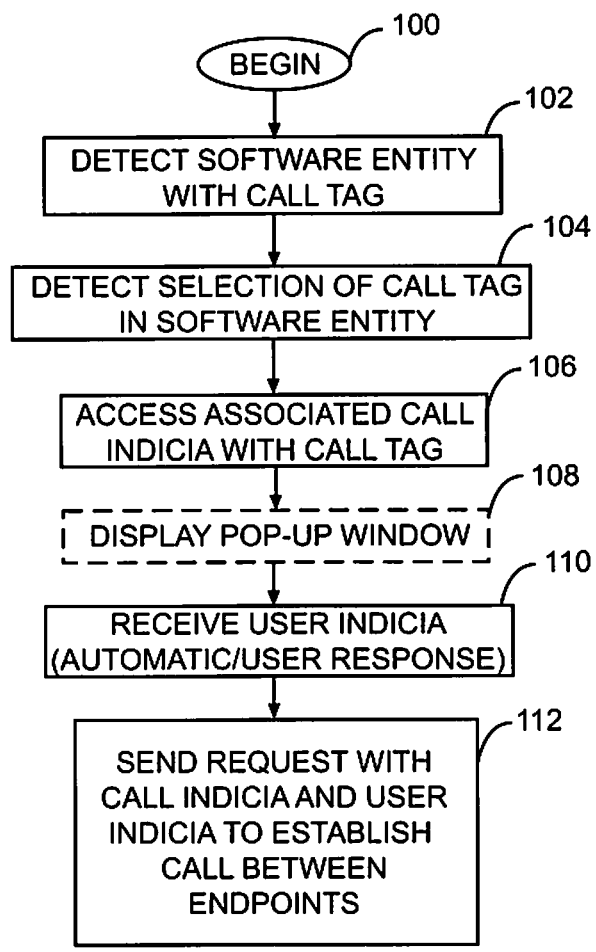
FIG. 5 is a flow diagram illustrating the operation of a telecom control function according to one embodiment of the present invention.

With reference to FIG. 5, a flow diagram is provided to illustrate operation of the telecom control function 14' according to one embodiment of the present invention. The process begins (step 100) wherein the telecom control function 14' detects the presence or activation of a software entity having a call tag (step 102). The telecom control function 14' will then detect when the call tag associated with the software entity is selected (step 104). The call indicia associated with the call tag is accessed (step 106), and if desired, a pop-up window 42 or like message is provided to the user via the computing terminal 12 (step 108). The pop-up window 42 provides a vehicle for receiving user indicia associated with selecting the call tag. Other vehicles are available, such as other software applications. The telecom control function will receive any user indicia in an automatic fashion, if predefined rules are established, or through an appropriate user response (step 110).

The telecom control function 14' may then send a request with any necessary call indicia and user indicia, including source, destination, and context information to the web server 16 for delivery to the service node 20 or directly to the service node 20 (step 112). The service node 20 may then initiate establishment of a call between one of the user's endpoints associated with the source information and a remote endpoint associated with the destination information based on the call indicia in light of any pertinent user indicia. For indirect call initiation, the computing terminal 12 is generally not involved in the call once the call is established. For direct call initiation, the computing terminal 12 will originate the call to the remote endpoint.

Figure 6:
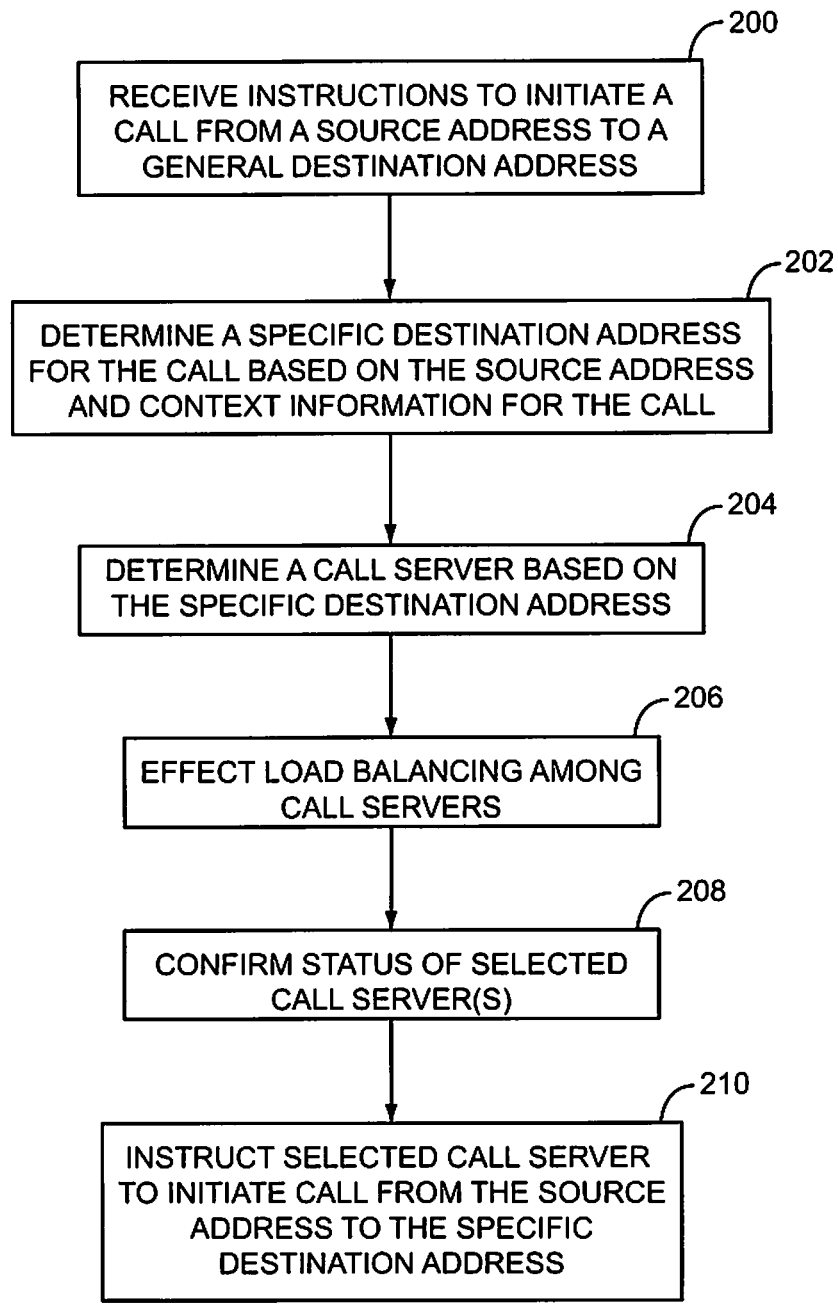
FIG. 6 is a flow diagram illustrating the operation of a service node according to one embodiment of the present invention.

Turning now to FIG. 6, a flow diagram is provided to illustrate operation of the service node 20 according to one embodiment of the present invention. Initially, the service node 20 will receive instructions from the web server 16 or directly from the computing terminal 12 to initiate a call from a source to a destination (step 200). In this example, assume the source information identifies the source address for the first terminal 24, which is associated with User 1. The source address is a directory number DN1. Further assume that the destination is a general destination that includes a general destination address, which is associated with any number of specific destinations, including specific destination addresses.

Based on the source address and any context information for the call, the service node 20 will determine a specific destination address to use for the call from the multiple specific destination addresses associated with the general destination address (step 202). This determination may be based on all or a portion of the source address, or any source related information. The context information may be derived from any source or destination information provided in the request, specific context information provided in the request, or information obtained from one of the databases 34. Once the actual destination address to use for establishing the call is determined, the service node 20 will determine an appropriate call server 22 to use for the call based on the specific destination address (step 204). Notably, if the instructions received from the computing terminal 12 identify the actual address to use when establishing the call, the service node 20 will use this address or related information to select the call server 22 to use for the call. The present invention selects an appropriate call server 22 based on the actual destination that will be used for the call. The actual destination may be determined by the service node 20 based on destination information provided from the computing terminal 12, or the actual destination may be the destination provided in the request from the computing terminal 12. Regardless of whether the actual destination for the call is provided by the computing terminal 12 or determined by the service node 20, the selection of the call server 22 to use for the call is preferably selected based on the actual destination used for the call.

If multiple call servers 22 are capable of establishing the call, the service node 20 may take the requisite steps to balance the load among these available call servers 22 (step 206). Load balancing may entail tracking the actual loads of the call servers 22 and selecting a single call server 22 from a group of available call servers 22 to maintain balanced loading among the call servers 22. Other criteria may be used to select one of a number of available call servers 22 to use for the call. Further, once a call server 22 is selected for the call, the service node 20 may confirm the status of the selected call server or servers 22 to ensure that the call server 22 is currently operable and capable of establishing the call (step 208). Once a single call server 22 has been selected to establish the call, the service node 20 will instruct the selected call server 22 to initiate the call from the source address to the specific destination address (step 210). As a result, the call is established between the endpoint associated with the source address and the endpoint associated with the specific destination address. Again, the service node 20 need not identify a specific destination address, and may use the destination address provided in the original request. As such, the endpoint associated with the actual destination address is the endpoint with which the call is established.

As indicated above, the service node 20 is capable of selecting from a number of specific destinations based on a general destination, which was provided in the request to the service node 20 from the computing terminal 12. Turning now to FIG. 7, a table is provided for a particular general destination, which is associated with a number of specific destinations, and in particular is associated with a number of specific destination addresses. A general destination is associated with the domain xyz.com or a corresponding directory number 800-XYZ-CORP. For the general destination, the table identifies a number of specific destination addresses corresponding to both source and context information. In operation, for any request to initiate a call toward the general destination xyz.com or 800-xyz-corp, the specific destination address to use for establishing the call is based on a prefix or a source address provided in the source information, and perhaps context information associated with the call.

For example, if the country prefix for the source address is +1, the specific destination address +1(416) 583-7382 is selected if the context information indicates that English is preferred for the call. The specific destination address +1(514) 373-2891 is selected if French is desired for the call. For source prefixes from +2 to +32, the specific destination address +44 09 12 22 42 84 is selected. For source prefix +33, the specific destination address +33 05 12 23 42 23 is selected. The only exception is when the source prefix is +23, and the context information is indicative of a reservation request. In that case, the specific destination address of +23 39 39 40 38 10 is selected. If the source information includes a SIP (Session Initiation Protocol) address, the specific destination address used is callcenter@xyz.com. From the above, when multiple specific destinations are available for a requested general destination, the service node 20 may use the source information, the context information, or a combination thereof to select the specific destination to use when establishing the call. The instructions sent to the selected call server 22 will identify the specific destination as the destination to which the call must be established.

With reference to FIG. 8, a call server selection table is illustrated according to one embodiment of the present invention. The call server selection table may be obtained from one of the databases 34 in response to receiving a request to initiate a call from the service node 20. The call server selection table may define one or more call servers that are capable of being used for different destinations. In the illustrated example, destination information, which identifies the prefix for a particular destination address, is associated with one or more call servers 22, CSA, CSB, CSC, . . . CSZ. In particular, any destination addresses having the prefix (area code)+1 (416) are capable of being established by call servers CSA and CSC. Similarly, calls intended for a destination address having a prefix of +1(514) or +33 are capable of being established by call server CSB. Destination addresses having the prefix +44 are capable of being supported by call server CSC, whereas calls intended for a SIP address are supported by call server CSZ. Accordingly, any or all of the destination information, including destination addresses, used by the call server 22 to establish the call may be used to select one or more available call servers 22 that are capable of establishing the call. Various criteria including load balancing, current status, service provider preferences, user preferences, or the like, may be used to assist in selecting a particular call server 22 to use when multiple call servers 22 are serving a particular destination.

Figure 9A:
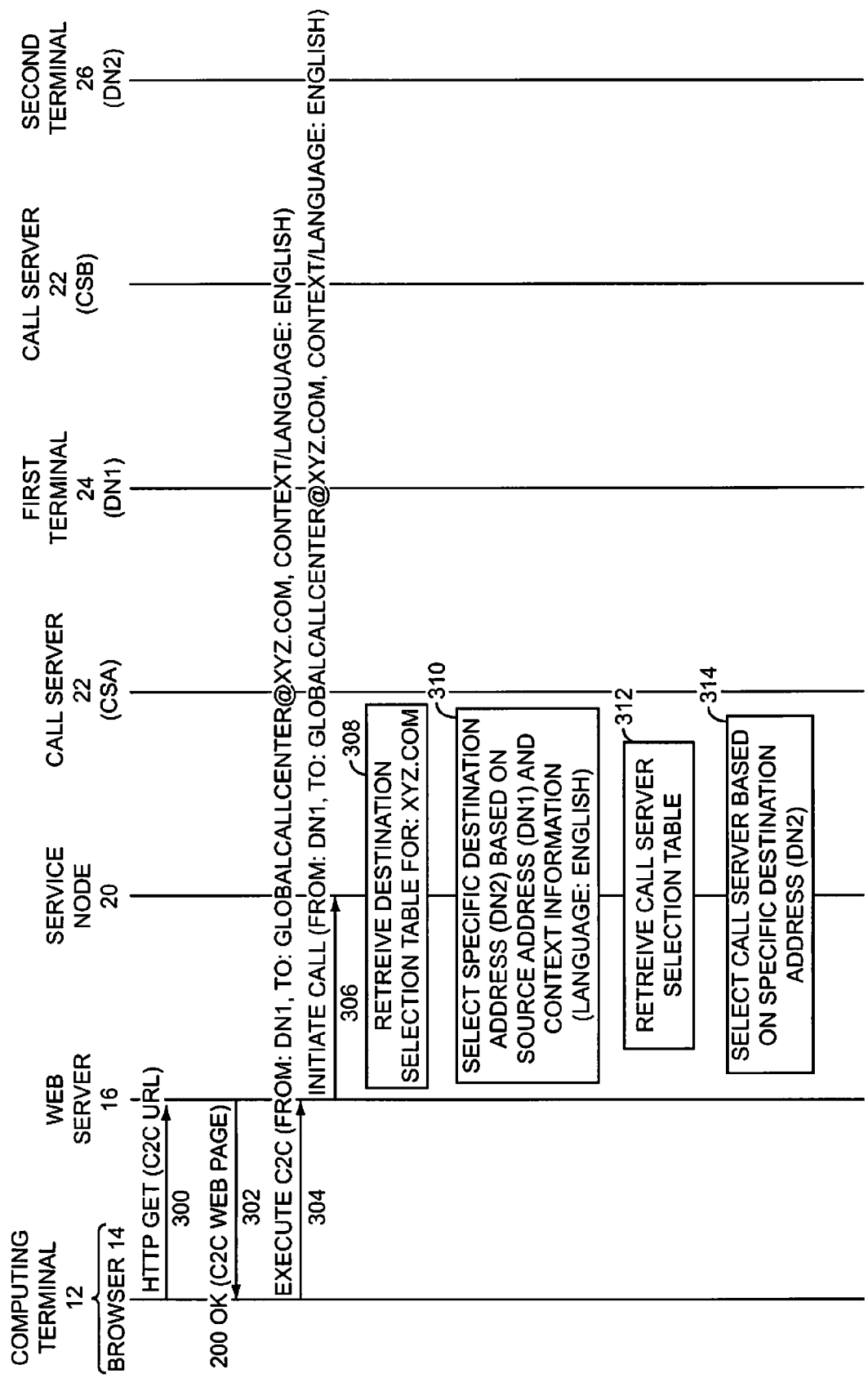
FIGS. 9A and 9B are a communication flow diagram illustrating exemplary operation of one embodiment of the present invention.
Figure 9B:
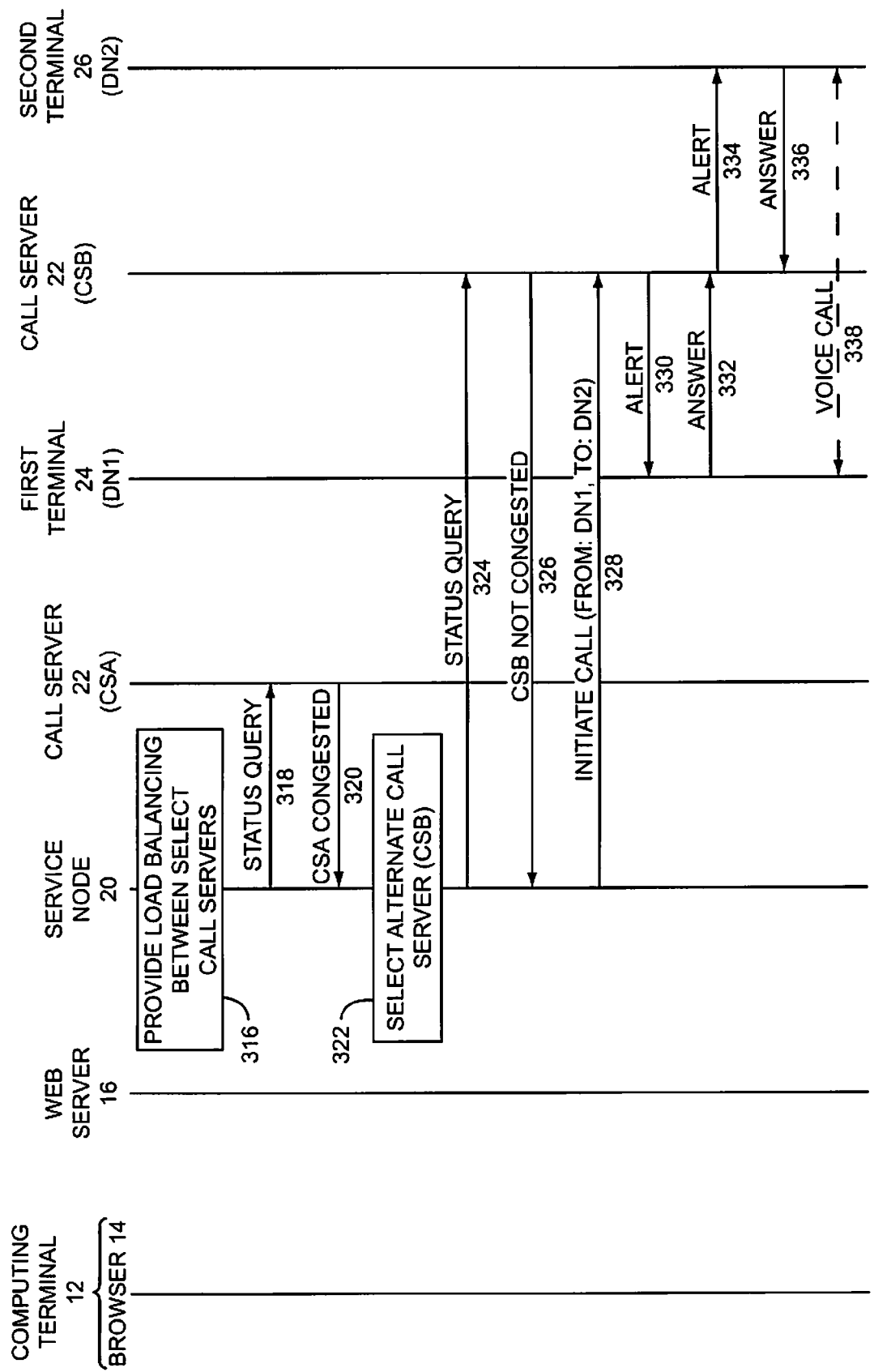

Turning now to FIGS. 9A and 9B, a communication flow is provided to illustrate exemplary operation of one embodiment of the present invention. Initially, the browser 14 may send to the web server 16 a hypertext transfer protocol (HTTP) Get message to obtain the content associated with the URL associated with a click-to-call web page (step 300). Based on the URL, the web server 16 will send a 200 OK message back to the browser 14 with the requested click-to-call web page content (step 302). Assuming the click-to-call web page has a call tag that is selected by the user and the computing terminal 12 obtains any necessary user information, the browser 14 may send a message back to the web server 16 to execute a click-to-call function (step 304). The message may include source information having the directory number DN1 as the source address, which is associated with the first terminal 24. The message sent to the web server 16 may also identify a specific or general destination for the call as well as any context information. In this case, a general destination is provided and is represented by globalcallcenter@xyz.com. The context information indicates that an English-speaking representative is requested. The web server 16 will recognize that a click-to-call call has been requested and will send an Initiate Call message to the service node 20 (step 306). The Initiate Call message will indicate that the call should be from a source address (DN1) to a general destination (globalcallcenter@xyz.com). The Initiate Call message may also provide the context information, which in this case indicates that the call can be sent to a destination where English is spoken.

Upon receiving the Initiate Call request, the service node 20 may retrieve a destination selection table for the general destination, perhaps from a database 34 (step 308). The service node 20 will then select a specific destination address based on the source address, and perhaps based on any available context information (step 310). Based on the specific destination address, the service node 20 will select an appropriate call server 22 to use for establishing the call (step 314). If multiple call servers 22 are selected based on the specific destination address, a particular one of the call servers 22 may be selected based on taking steps to facilitate load balancing among the selected call servers 22. Assuming the call server CSA is selected, the service node 20 may send a status query to call server CSA (step 318), which may respond with an indication that it is congested (step 320). Based on this response, the service node 20 may select an alternate call server CSB (step 322).

The service node 20 may then send a status query to call server CSB (step 324). Assuming call server CSB is not congested and is available to establish a call, a message is sent back to the service node 20 indicating that call server CSB is not congested (step 326). The service node 20 may then send instructions to call server CSB to initiate a call from the source address DN1 to the specific destination address DN2 (step 328). The call server CSB will then take the necessary steps to interact directly or indirectly with the first terminal 24 and the second terminal 26 to effectively establish a voice call therebetween. This functionality is represented by sending an Alert to the first terminal 24 (step 330) and receiving an Answer message back from the first terminal 24 when User 1 answers the first terminal 24 (step 332). Similarly, the call server CSB will send an Alert toward the second terminal 26 (step 334) and will receive an Answer message back when the second terminal 26 is answered by the remote party (step 336). The requisite processing is provided to establish a bearer path between the two terminals 24, 26 and a voice call is established (step 338).

Figure 10:
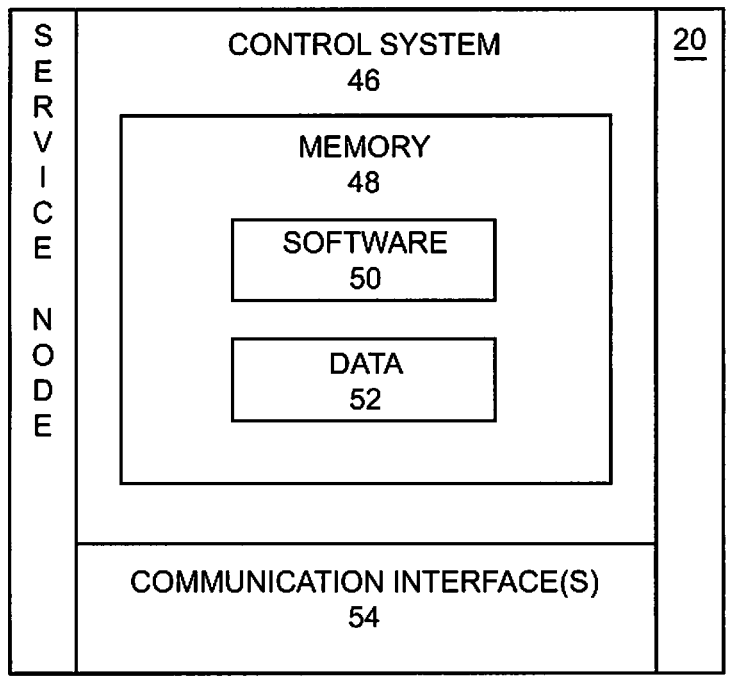
FIG. 10 is a block representation of a service node according to one embodiment of the present invention.

With reference to FIG. 10, an exemplary service node 20 is illustrated. The service node 20 may include a control system 46 with sufficient memory 48 for the requisite software 50 and data 52 to operate as described above. One or more communication interfaces 54 may be provided to facilitate communication with various entities, including the computing terminal 12, web server 16, databases 34, call servers 22, and the like.

Figure 11:
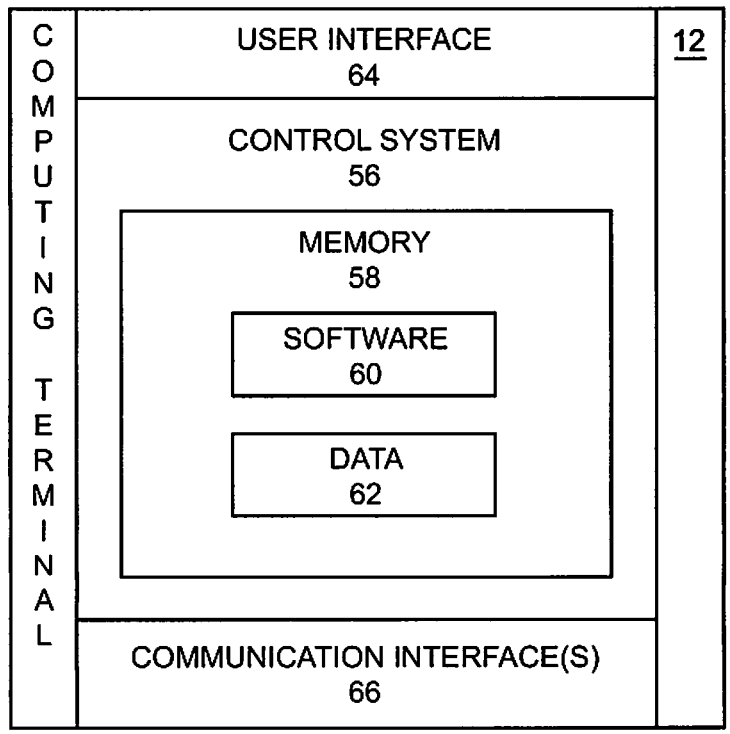
FIG. 11 is a block representation of a computing terminal according to one embodiment of the present invention.

With reference to FIG. 11, an exemplary computing terminal 12 is illustrated. The communication terminal 12 may include a control system 56 with sufficient memory 58 for the requisite software 60 and data 62 to operate as described above. The software 60 may support various applications supporting various electronic documents, wherein certain of the applications or electronic documents may represent a software entity. The software 60 may also support all or a portion of the telecom control function 14' as well as the web browser 14, which may also be a software entity. The various applications may run on an appropriate operating system, which may be configured to support all or a part of the telecom control function 14' and web browser 14. The control system 56 may also be associated with an appropriate user interface 64 as well as any number of communication interfaces 66, to facilitate communications with any variety of networks, including the Internet 18, VoP network 32, and the PSTN 30.

Those skilled in the art will recognize improvements and modifications to the preferred embodiments of the present invention. All such improvements and modifications are considered within the scope of the concepts disclosed herein and the claims that follow.

What is claimed is:

1. A method of establishing a click-to-call communication session comprising:

receiving, from a computing terminal, a web-based request to establish a click to-call communication session between a first endpoint associated with source information and a second endpoint, wherein the web-based request identifies a general destination address associated with a plurality of specific destination addresses; wherein the web-based request is, or is based on, an initial request from the computing terminal to initiate the click-to-call communication session, wherein the computing terminal is separate from the first endpoint and the second endpoint; and wherein the initial request is a browser request from a browser running on the computing terminal;

selecting, using a service node, a specific destination address from the plurality of specific destination addresses based on the source information; wherein the source information comprises a first address for the first endpoint and the destination information comprises a second address associated with the second endpoint; wherein the first address comprises at least one of the group consisting of a directory number and a uniform resource identifier; and wherein the second address comprises at least one of the group consisting of a directory number and a uniform resource identifier;

identifying, using the service node, a select call server for establishing the click to-call communication session based on destination information associated with the specific destination address; wherein identifying the select call server comprises:
   selecting a first call server;
   obtaining a status of the first call server; and
   determining whether to use the first call server as the select call server based on the status of the first call server; and
sending to the select call server instructions to establish the click-to-call communication session between the first endpoint and the second endpoint, wherein the instructions provide the specific destination address to use when establishing the click-to-call communication session between the first endpoint and the second endpoint.

2. The method of claim 1, wherein the select call server is identified from a plurality of call servers.

3. The method of claim 1, wherein identifying the select call server comprises identifying a plurality of capable call servers and selecting one of the plurality of capable call servers, wherein each of the plurality of capable call servers is capable of establishing the click-to-call communication session between the first endpoint and the second endpoint.

4. The method of claim 3, wherein the select call server is selected to facilitate load balancing among the plurality of capable call servers.

5. The method of claim 1, wherein when the first call server is not used as the select call server based on the status of the first call server, the method further comprises:
   selecting a second call server;
   obtaining a status of the second call server; and
   determining whether to use the second call server as the select call server based on the status of the second call server.

6. The method of claim 1, wherein the identifying the select call server is further based on the specific destination address and wherein the instructions provide the specific destination address to use when establishing the dick-to-call communication session between the first endpoint and the second endpoint.

7. The method of claim 1, wherein the source information comprises at least a portion of a source address associated with the first endpoint.

8. The method of claim 7, wherein the at least a portion of the source address is a prefix associated with a directory number.

9. The method of claim 1, wherein selecting the specific destination address from the plurality of specific destination addresses is further based on context information that identifies a defined context for the click-to-call communication session.

10. The method of claim 1, further comprising selecting the specific destination address from the plurality of specific destination addresses based on context information that identifies a defined context for the click-to-call communication session, wherein the select call server is identified based on the specific destination address and the instructions provide the specific destination address to use when establishing the click-to-call communication session between the first endpoint and the second endpoint.

11. The method of claim 1, wherein the web-based request is received from the computing terminal through a web server.

12. The method of claim 1, wherein the web-based request to establish the click-to-call communication session comprises at least a portion of the destination information associated with the second endpoint.

13. The method of claim 1, wherein the sending to the select call server instructions further comprising sending instructions to the select call server to establish the click-to-call communication session at least in part over a Voice over Packet (VoP) network.

14. A service node for establishing a click-to-call communication session comprising:
   at least one communication interface; and
   a control system associated with the at least one communication interface and adapted to:
   receive a web-based request from a computing terminal to establish the click-to-call communication session between a first endpoint associated with source information and a second endpoint associated with destination information, wherein the web-based request identifies a general destination address associated with a plurality of specific destination addresses; wherein the web-based request is, or is based on, an initial request from the computing terminal to initiate the click-to-call communication session, wherein the computing terminal is separate from the first endpoint and the second endpoint; and wherein the initial request is a browser request from a browser running on the computing terminal;
   select a specific destination address from the plurality of specific destination addresses based on the source information; wherein the source information comprises a first address for the first endpoint and the destination information comprises a second address associated with the second endpoint; wherein the first address comprises at least one of the group consisting of a directory number and a uniform resource identifier; and wherein the second address comprises at least one of the group consisting of a directory number and a uniform resource identifier;
   identify a select call server to employ for establishing the click-to-call communication session based on destination information associated with the specific destination address; wherein to identify the select call server, the control system is further adapted to:
      select a first call server;
      obtain a status of the first call server; and
      determine whether to use the first call server as the select call server based on the status of the first call server; and
   send to the select call server instructions to establish the click-to-call communication between the first endpoint and the second endpoint, wherein the instructions provide the specific destination address to use when establishing the click-to-call communication session between the first endpoint and the second endpoint.

15. The service node of claim 14, wherein the select call server is identified from a plurality of call servers.

16. The service node of claim 14, wherein to identify the select call server, the control system is further adapted to identify a plurality of capable call servers and select one of the plurality of capable call servers, wherein each of the plurality of capable call servers is capable of establishing the click-to-call communication session between the first endpoint and the second endpoint.

17. The service node of claim 16, wherein the select call server is selected to facilitate load balancing among the plurality of capable call servers.

18. The service node of claim 14, wherein when the first call server is not used as the select call server based on the status of the first call server, the control system is further adapted to:

select a second call server;

obtain a status of the second call server; and determine whether to use the second call server as the select call server based on the status of the second call server.

19. The service node of claim 14, wherein the service node is further adapted to identify the select call server based on the specific destination address and wherein the instructions provide the specific destination address to use when establishing the click-to-call communication session between the first endpoint and the second endpoint.

20. The service node of claim 14, wherein the source information comprises at least a portion of a source address associated with the first endpoint.

21. The system of claim 20, wherein the at least a portion of the source address is a prefix associated with a directory number.

22. The service node of claim 14, wherein the specific destination address is selected from the plurality of specific destination addresses based on context information that identifies a defined context for the click-to-call communication session.

23. The service node of claim 14, wherein the control system is further adapted to select a specific destination address from the plurality of specific destination addresses based on context information that identifies a defined context for the click-to-call communication session, wherein the select call server is identified based on the specific destination address and the instructions provide the specific destination address to use when establishing the click-to-call communication session between the first endpoint and the second endpoint.

24. The service node of claim 14, wherein the web-based request is received from the computing terminal through a web server.

25. The service node of claim 14, wherein the web-based request to establish the click-to-call communication session comprises at least a portion of the destination information associated with the second endpoint.

26. The service node of claim 14, wherein the service node is further adapted to send instructions to the select call server to establish the click-to-call communication session at least in part over a Voice over Packet (VoP) network.

27. A network comprising:

means for receiving a web-based request from a computing terminal to establish a click-to call communication session between a first endpoint associated with source information and a second endpoint, wherein the web-based request identifies a general destination address associated with a plurality of specific destination addresses; wherein the web-based request is, or is based on, an initial request from the computing terminal to initiate the click-to-call communication session, wherein the computing terminal is separate from the first endpoint and the second endpoint; and wherein the initial request is a browser request from a browser running on the computing terminal;

means for selecting a specific destination address from the plurality of specific destination addresses based on the source information; wherein the source information comprises a first address for the first endpoint and the destination information comprises a second address associated with the second endpoint; wherein the first address comprises at least one of the group consisting of a directory number and a uniform resource identifier; and wherein the second address comprises at least one of the group consisting of a directory number and a uniform resource identifier;

means for identifying a select call server for establishing the click-to-call communication session based on destination information associated with the specific destination address; wherein to identify the select call server, the means for identifying:

selects a first call server;

obtains a status of the first call server; and determines whether to use the first call server as the select call server based on the status of the first call server; and means for sending to the select call server instructions to establish the click-to call communication session at least in part over a Voice over Packet (VoP) network between the first endpoint and the second endpoint wherein the instructions provide the specific destination address to use when establishing the click-to-call communication session between the first endpoint and the second endpoint.

* * * * *